Nov. 10, 1964   W. L. OLDS ETAL   3,156,337
COUPLING DEVICE FOR TOOL SPINDLE
Filed Feb. 15, 1961   2 Sheets-Sheet 1
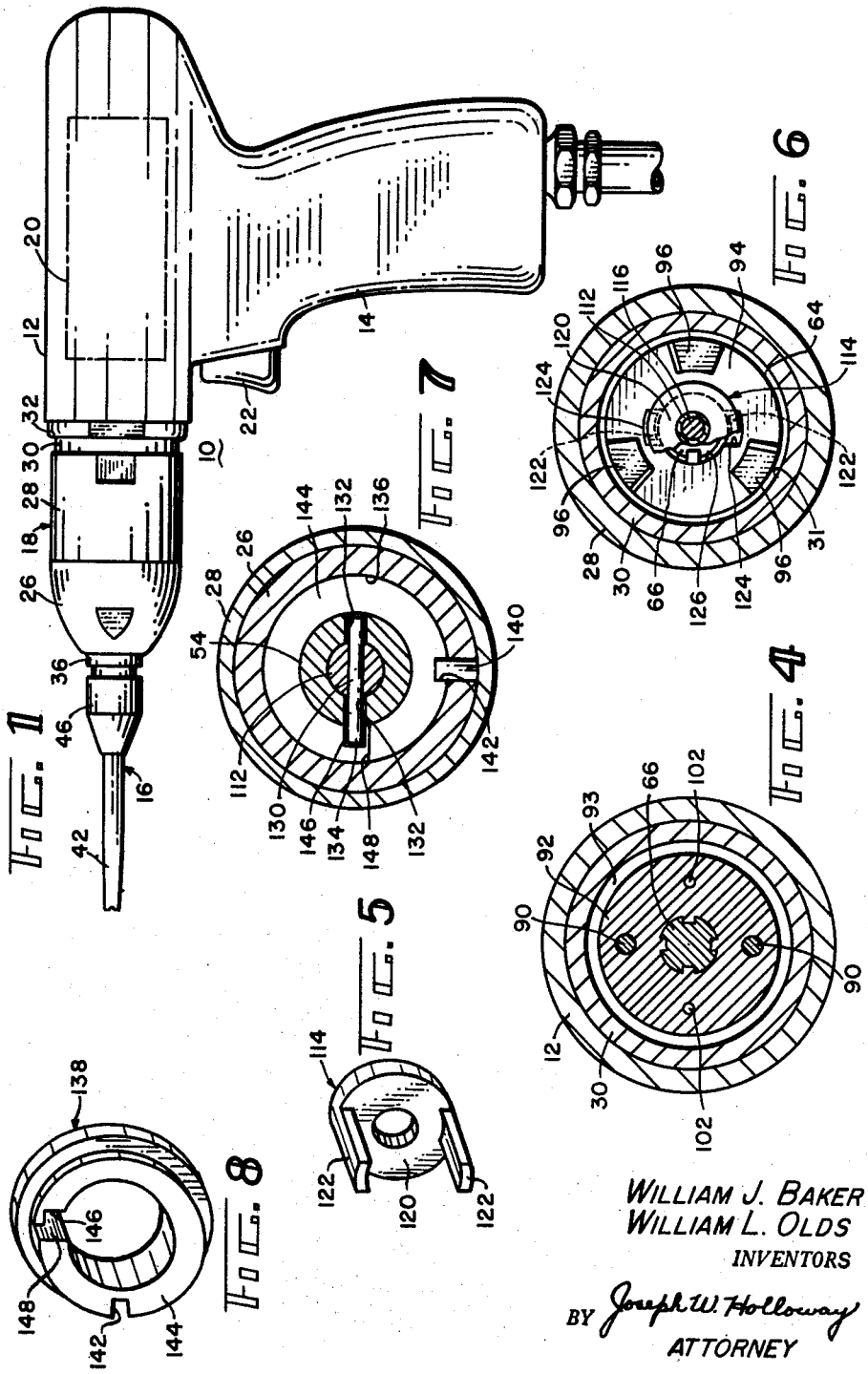
WILLIAM J. BAKER
WILLIAM L. OLDS
INVENTORS
BY Joseph W. Holloway
ATTORNEY

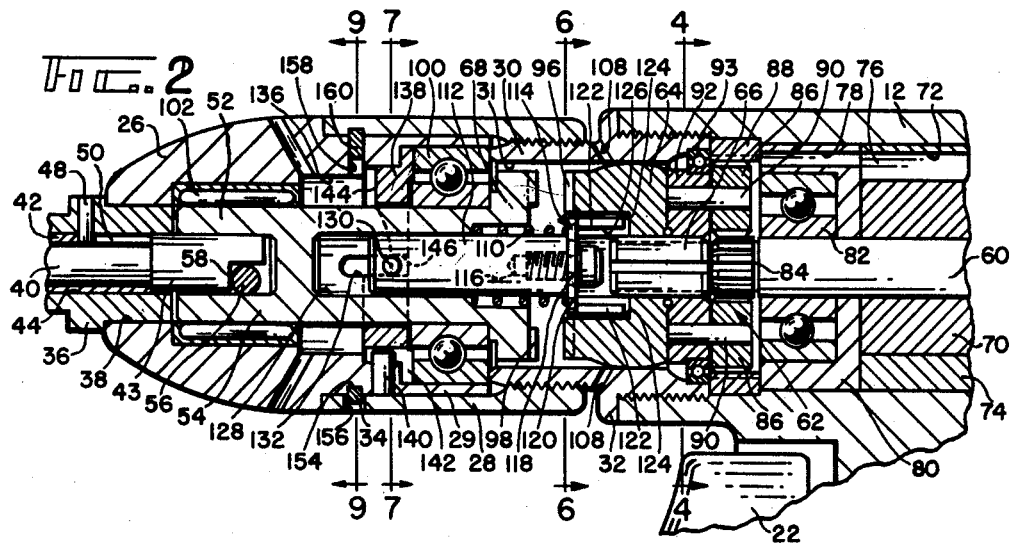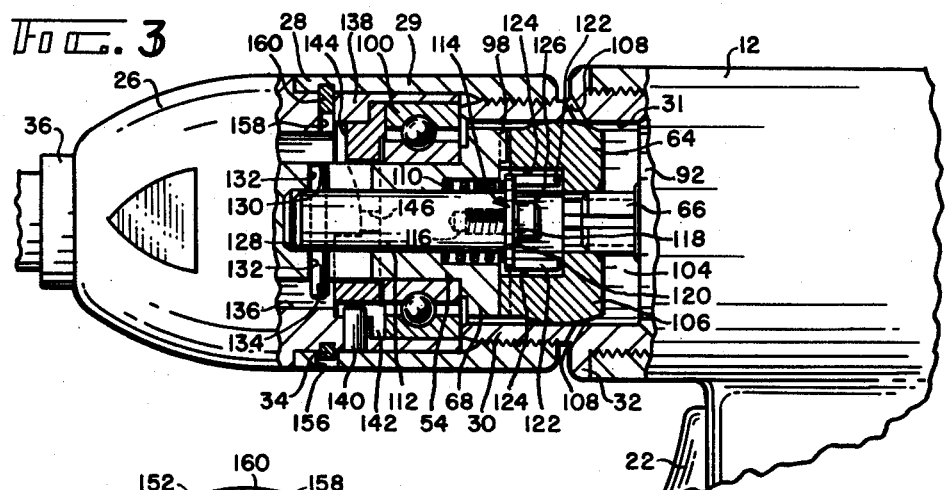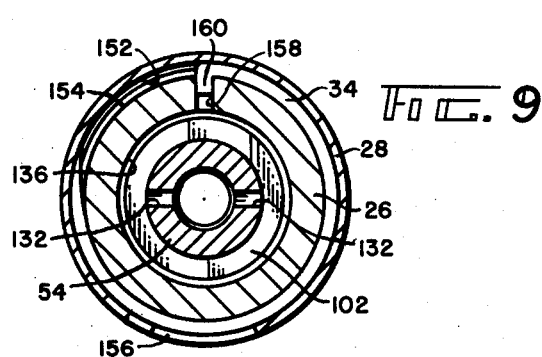

UNITED STATES PATENT OFFICE 3,156,337
Patented Nov. 10, 1964

3,156,337
COUPLING DEVICE FOR TOOL SPINDLE
William L. Olds and William J. Baker, Spring Lake, Mich., assignors to Gardner-Denver Company, a corporation of Delaware
Filed Feb. 15, 1961, Ser. No. 89,531
6 Claims. (Cl. 192—148)

The present invention relates generally to rotary tools and machines and, more particularly, to an improved construction adapted for positive indexing of implement-holding spindles employed in such tools and machines.

In the usage of many kinds of tools intended to perform highly repetitive operations, it is desirable that, following each operation, a spindle-driven rotary work implement be returned to a preselected angular position with respect to the tool axis. In hand-held conductor-wrapping tools, for example, the operator is required to load manually a portion of a conductor into a radially offset groove at the remote end of a wrapping bit. To attain maximum speed and proficiency in the use of this kind of tool, the operator must be able to locate the offset conductor-receiving groove without visual assistance; therefore, it is essential that the tool spindle and the attached wrapping bit be positively indexed to return the groove to a predetermined angular position known to the operator. Accordingly, the broad object of the present invention is to provide an improved indexing means for implement spindles employed in the aforedescribed type of tools and machines.

Another broad object of the present invention is the provision of a spindle indexing means which utilizes the inertial rotation of an associated rotary driver to provide torque for positively indexing working implements having substantial resistance to rotation.

Another object is to provide a device for connecting a rotary driver in driving relationship with a rotatable spindle whereby the spindle is driven through a releasable clutch connection for working and the spindle is driven through an overriding connection to an indexed position.

A still more specific object is to provide a spindle indexing means for a tool of the aforedescribed type wherein the rotation arresting element of the indexing means may be selectively adjusted to index the spindle in innumerable angular orientations with respect to the axis of the tool.

These and other objects and advantages will appear upon reading the following specification and claims and upon considering in connection therewith the attached drawings in which:

FIG. 1 is a side elevational view of a tool embodying the present invention;
FIG. 2 is a fragmentary longitudinal sectional view of the tool shown in FIG. 1;
FIG. 3 is a view similar to FIG. 2 wherein the tool motor is energized;
FIG. 4 is a cross sectional view taken along lines 4—4 of FIG. 2;
FIG. 5 is a view in perspective of a coupling member 114 shown in FIGS. 2 and 3;
FIG. 6 is a cross sectional view taken along lines 6—6 of FIG. 2;
FIG. 7 is a cross sectional view taken substantially along lines 7—7 of FIG. 2;
FIG. 8 is a view in perspective of a stop plate 138 shown in FIGS. 2 and 3; and,
FIG. 9 is a cross sectional view taken substantially along lines 9—9 of FIG. 2.

The present invention is embodied in a hand tool designated generally by numeral 10. The exemplary tool is adapted for actuation by pressure fluid, such as compressed air; however, it is not intended that the invention be limited thereto. As will hereinafter appear, the exemplary tool comprises a device for wrapping flexible conductors about electrical terminals; however, it will be understood that the hereinafter described indexing mechanism may be advantageously incorporated in various tools and machines requiring positive indexing of a driven rotary spindle.

The tool shown in FIG. 1 generally comprises a motor housing 12 having an integrally formed handle 14 depending therefrom and a wrapping bit assembly 16 which is removably attached to the forward end of the housing 12 by a nose assembly 18. A rotary driver comprising an air motor 20 of the sliding vane type is disposed in housing 12 and is energized by manual depression of a trigger element 22 which controls a conventional fluid valve, not shown, disposed within handle 14. Depression of the trigger element 22 opens the aforementioned fluid valve to communicate motive air from conduit 24 through suitable passage means, not shown, formed in handle 14 to the motor 20. Since the motor 20 is conventional in structure and operation, it will not be described in detail.

As best illustrated in FIG. 2, the various parts comprising the nose assembly 18 are disposed within a plural-part housing which comprises a nose piece 26, a sleeve 28 telescoping about a reduced diameter portion 29 of the nose piece, and a coupling 30 threadably connecting the sleeve 28 and the forward end of motor housing 12. The threaded ends of coupling 30 engage with internally threaded openings in the sleeve 28 and the motor housing 12; and, a radial flange 32 formed intermediate the length of coupling 30 abuts the extreme forward end of motor housing 12 in the fully assembled position of the parts. The nose piece 26 and the sleeve 28 are held against relative axial movement by means of a substantially annular key 34. As will be hereinafter more fully described, the angular position of the nose piece 26 with respect to the sleeve 28 and the housing 12 is adjustable through 360° for a purpose to be explained.

FIG. 2 shows a collet 36, which is nonrotatably disposed in a central opening 38 in the forward end of nose piece 26, and a wrapping bit 40 and a bit sleeve 42 which are insertable into the central bore 44 of the collet. The bit sleeve 42 is secured within collet 36 by the usual collet nut 46 and is nonrotatably held within the collet bore 44 by an interfitting pin and slot structure comprising a pin 48 which radially penetrates collet 36 and a longitudinally extending slot 50 which opens to the rear end of bit sleeve 42. The wrapping bit 40, which may be of any suitable construction, is received and supported within bit sleeve 42 in relatively rotatable, but nonreciprocable relationship thereto. In the preferred construction shown in FIG. 2, an enlarged bit head 43 is insertable into an hollow extension 52 of a rotary spindle 54; and, the bit 40 is held in driving relationship with spindle 54 by a transverse pin 56 which seats in a notch 58 relieved at the rear end of the bit head 43.

The driving linkage between motor 20 and wrapping bit 40 includes a motor shaft 60 and a planetary gear assembly 62 which is driven by motor shaft 60 and has its output coupled to an upper clutch member 64 by means of a splined shaft 66. As indicated by FIG. 3, the upper clutch member 64 is axially movable in the forward direction to engage an enlarged clutch face 68 integrally formed on the rear end of rotary spindle 54, thereby rotating the spindle and the attached bit 40 for performing conductor wrapping operations.

As seen in FIG. 2, the motor 20 comprises the usual rotor 70 which is rotatable within a surrounding eccentric bore 72 formed in a cylinder 74. Rotation of rotor 70 is effected by the expansion of motive air in radially arranged chambers defined by vanes or blades, not shown, carried by the rotor in sliding engagement with the bore 72 of cylinder 74. Motor chamber 76, which is in position to be exhausted, is vented forwardly through an exhaust port 78 in a motor end plate 80. The forward end of the motor shaft 60 is rotatably journalled in a bearing 82 which is seated in a forwardly opening recess in the motor end plate 80. A speed-reduction gear assembly, generally indicated by numeral 62, comprises a pinion gear 84 formed on motor shaft 60 which intermeshes with a pair of idler gears 86 and drives the same for rotation within a surrounding ring gear 88. As seen in FIGS. 2 and 4, the idler gears 86 are journalled on pins 90 carried by an idler gear plate 92; and, the idler gear plate 92 is rotatably journalled in coupling 30 by a bearing 93. The splined shaft 66 couples the upper clutch member 64 and the idler gear plate 92 in relatively reciprocable, but nonrotatable relationship to one another. FIGS. 2 and 3 demonstrate that the upper clutch member 64 is axially reciprocable within the bore 31 of coupling 30 in sealed relationship thereto and that, in the forward-most axial position, the upper clutch member 64 is maintained in rotary driving relation with the idler gear plate 92 by the splined shaft 66. The forwardly facing surface 94 of the upper clutch member 64 is provided with radially spaced teeth 96 which are adapted to engage teeth 98 extending rearwardly from the enlarged clutch face 68 and to drive the spindle 54 which is rotatably journalled by bearings 100 and 102.

The upper clutch member 64 is axially shifted for driving engagement with spindle 54 in response to energization of the motor 20 in the following manner: Motor exhaust vented from the motor chamber 76 is communicated through exhaust port 78 and a pair of apertures 102 opening through the idler gear plate 92 to an expansible chamber 104 defined by the cylindrical bore 31 of connector 30, the idler gear plate 92 and the rearwardly facing surface 106 of the upper clutch member 64. Admission of exhaust air into chamber 104 causes the upper clutch member 64 to shift axially forwardly from a disengaged position shown in FIG. 2, to an engaged position, shown in FIG. 3. Rotation and forward axial movement of the upper clutch member occur substantially simultaneously in response to energization of motor 20 by depression of trigger element 22. The limiting forward position of the upper clutch member 64 is established by full engagement of the clutch teeth 96 and 98; and, in this position, as shown in FIG. 3, a pair of exhaust openings 108 are overrun by the side wall of the upper clutch member 64 to vent the expansible chamber 104 to atmosphere. The combined cross sectional area of the exhaust openings 108 is selected so that the flow of exhaust therethrough is restricted to maintain sufficient air pressure in chamber 104 to hold the upper clutch member in positive driving engagement with the spindle 54. Upon deenergization of motor 20, the upper clutch member is biased rearwardly to the disengaged position, shown in FIG. 2, by a compression spring 110.

As thus far described, the exemplary tool comprises a rotary driver, motor 20, having its output operatively connectable to a driven spindle 54 by a releasable clutch means means 64 and 68, whereby a movable member 64 of the clutch means is operable for clutch engagement in response to energization of the rotary driver. In conventional rotary tools having the same general construction as that just described, the driven spindle rotates freely to a stop following disengagement of the clutch means; and, where such tools are provided with spindle indexing means, free rotation of the spindle is conventionally arrested by a stop member or equivalent means which interferes with a cooperating portion of the spindle assembly. Other well-known devices for indexing a rotary spindle after interruption of a positive motor driving connection typically comprise a spring member cooperable with the spindle in such a manner as to be loaded by motor rotation and subsequently unwound to drive the spindle to an indexed position. In the case of spindle indexing accomplished by free rotation or coasting of the spindle assembly, the available indexing torque is limited to that provided by the inertial rotation of the spindle and an implement attached thereto. Since indexing rotation by spring loaded devices is conventionally in the opposite direction to working rotation of the spindle, the available indexing torque for such devices is limited to that torque developed by the spring alone. Moreover, experience has shown that neither of the aforedescribed indexing devices for rotary tools are suitable in applications having relatively high indexing torque requirements. One type of implement which is not efficiently indexed by available indexing mechanisms is a multiple-bit wire wrapping device wherein the implement spindle is required to drive at least two intergeared wrapping bits. It has been observed that neither the inertia of the moving parts of the implement, nor conventional spring indexing devices is capable of developing sufficient indexing torque to overcome the inherent frictional resistance to rotation of the intermeshing gears typically incorporated in a multiple-bit attachment of this sort. Therefore, an essential feature of the present invention is the provision of a rotary indexing structure for tools of the kind under consideration wherein sufficient indexing torque is delivered to the implement holding spindle to assure positive and accurate indexing operation even where the implement is characterized by substantial resistance to indexing due to its mass or structure.

Broadly, an indexing means constructed in accordance with the present invention comprises an overriding drive connection between the rotary driver, motor 20, and the implement spindle 54, whereby the spindle 54 is driven to an indexed angular position by utilizing the torque developed by inertial rotary movement of the motor 20, the gear assembly 62 and the upper clutch member 64 in addition to the torque developed by inertial rotation of the spindle 54 and a working implement attached thereto. In this construction, the inertia of the relatively great mass of the rotating parts of motor 20 is advantageously employed for indexing spindle 54 after the positive clutch connection therebetween is interrupted by deenergization of the motor.

The torque developed by inertial rotation of the motor 20, gear assembly 62 and upper clutch member 64 is applied to spindle 54 by means of an interconnecting drive shaft 112 interposed between the upper clutch member 64 and spindle 54. A bifurcated cup member, shown in FIG. 5 and indicated generally by numeral 114, is secured in abutting relation to the rear end of drive shaft 112 by a headed metal fastener, such as screw 116, and; a split washer 118, or an equivalent locking device, is interposed between the head of screw 116 and an annular body portion 120 of cup member 114. A pair of radially opposed legs 122 extending rearwardly from the body portion 120 of the cup member 114 interfit with a pair of radially opposed recesses 124 opening into a central cylindrical recess 126 in the upper clutch member 64. As shown by FIGS. 2 and 6, the body portion 120 of cup member 114 is engaged and biased by the spring 110 into abutment with that portion of clutch surface 94 which surrounds the periphery of recess 126, thereby providing a positive axial driving engagement between the axially movable upper clutch member 64 and the drive shaft 112. As will be understood from FIGS. 2 and 3, the drive shaft 112 is supported for axial reciprocation within a surrounding recess 128 opening to the rear of spindle 54.

Rotary movement of the upper clutch member 64 is coupled to drive shaft 112 by means of the cup member 114 and from drive shaft 112 to the spindle 54 by means of a transverse stop pin 130 which holds the drive shaft 112 and the spindle 54 in relatively recriprocable, but nonrotatable relationship to one another. As shown in FIGS. 2, 3, and 7, the stop pin 130 penetrates the forward end portion of the drive shaft 112 and extends radially therefrom into a pair of elongated slots 132 opening laterally through spindle 54 from recess 128. One end portion 134 of stop pin 130 extends radially outwardly through an associated slot 132 beyond the outer cylindrical surface of spindle 54 into a stepped bore 136 in nose piece 26. An annular stop plate, separately shown in FIG. 8 and generally indicated by numeral 138, is disposed in the nose piece bore 136 in surrounding coaxial relationship with spindle 54 and is nonrotatably held therein by the interfitting engagement of a pin 140 in a peripheral notch 142. The aforementioned end portion 134 of stop pin 130 extends radially outwardly from spindle 54 into alinement with a substantially helical surface 144 formed on stop plate 138. With the spindle 54 in the angular position, shown in FIGS. 2 and 7, the spring 110 acts to resiliently urge the stop pin end portion 134 into interfitting engagement with a notch 146 which is relieved in the helical surface 144; and, as will be more fully described, the coaction of the stop pin 130 and notch 146 provides a positive indexed position for spindle 54 with respect to motor housing 12 and handle 14.

The following is a functional description of the cooperation of the spindle indexing means and the spindle driving means of the exemplary tool. When tool 10 is energized and the clutch members 64 and 68 are engaged, as shown in FIG. 3, for driving spindle 54 and the wrapping bit 40, the drive shaft 112 will have been moved forwardly within the spindle recess 128, thereby unseating the stop pin 130 from notch 146 and moving the same forwardly out of contact with the helical surface 144 of stop plate 138. Thus, splindle 54 is free to rotate with respect to stop plate 138 when motor 20 is energized. When motor 20 is deenergized, the biasing action of spring 110 causes drive shaft 112 to move rearwardly and to carry stop pin 130 into intimate sliding engagement with the helical surface 144 of stop plate 138. The inertial rotation of motor 20 imparts a torque to drive shaft 112 and spindle 54 in the aforedescribed manner and thereby moves portion 134 of stop pin 130 along and around the helical surface 144 of stop plate 138 until it strikes a stop shoulder 148 located at the bottom of the helix and positively seats in notch 146. After the rotation of spindle 54 and drive shaft 112 is interrupted by the seating of stop pin portion 134 in notch 143, slippage occurs between the cup member 114 and the extreme rear surface of drive shaft 112 thereby avoiding damage to various parts of the tool due to sudden stoppage of spindle 54. The rotational slippage between cup member 114 and drive shaft 112 may be controlled by adjusting the screw 116 to provide the desired amount of frictional resistance to relative movement of these parts. It will be understood from the foregoing description that screw 116 should be tightened down sufficiently to couple adequate torsional force from motor 20 for positively indexing spindle 54, yet allowing the cup member to rotatably override the drive shaft 112 after the spindle is stopped in its properly indexed position.

In carrying out another important aspect of the present invention, the angular relationship of notch 146 of the stop plate 138 with respect to nose piece 26 is made fully adjustable in order to provide an infinite number of indexed angular positions for the spindle 54. Generally, this is accomplished by rotating nose piece 26 with respect to sleeve 28 thereby altering the angular position of the indexing notch 146 with respect to sleeve 28, coupling 30 and the motor housing 12. As best illustrated in FIGS. 2, 3, and 9, sleeve 28 and the reduced diameter portion 29 of nose 26 are held against relative axial movement by the substantially annular key 34 which is composed of flexible metallic material. In assembling nose piece 26 with sleeve 28, mating grooves 152 and 154 are axially alined to form an annular chamber for receiving and retaining the key 34. Preparatory to assembling key 34, an arcuate slot 156 opening through sleeve 28 is radially alined with a recess 158 in the nose piece and an inwardly bent tang 160 on one end of the key 34 is inserted through the opening 156 to seat in recess 158. Rotation of the nose piece 26 in the proper direction with respect to the sleeve 28 will then draw the key 34 through opening 156 into the aforementioned annular chamber to the fully assembled position shown in FIG. 9. After the key 34 is fully assembled, the sleeve 28 may be tightened down upon coupling 30 thereby causing the nose piece 26 and the sleeve 28 to exert oppositely directed lateral pressures upon key 34 sufficient to prevent relative rotation between nose piece 26 and sleeve 28 until such time as the sleeve 28 is backed off from the coupling 30. From the foregoing, it will be apparent that innumerable orientations of the stop plate 138 with respect to the motor housing 12 and handle 14 may be attained by loosening the threaded connection between the sleeve 28 and the coupling 301 sufficiently to permit angular adjustment of the nose piece 26 with respect to the sleeve 28.

While the present indexing means has been shown and described as having particular utility when employed with an exemplary tool intended to perform conductor wrapping operations, it will be appreciated that the invention broadly contemplates an adjustable indexing structure which advantageously employs the inertial torque of an associated rotary driver to rotate an implement spindle to a preselectable indexed angular position subsequent to interruption of a releasable operating drive connection between the driver and the spindle. Moreover, it will be understood that the above description and accompanying drawings comprehend only the general and preferred embodiment of the present invention and that various changes in construction, proportion, and arrangement of parts may be made without departing from the spirit of the invention as set forth in the appended claims. For example, it will be apparent to those skilled in the design and manufacture of the kind of rotary tools under consideration that an electrically operated rotary driver could be substituted for air motor 20 and that the reciprocable upper clutch member 64 could be linked to the trigger element 22 for mechanical rather than pneumatic actuation.

Having fully described the invention, what is claimed as new and useful is:

1. Spindle housing means;
   spindle means rotatable with respect to said housing means;
   spindle driving means;
   first and second coupling means between said spindle means and said driving means;
   said first coupling means including releasable means;
   said second coupling means connecting said driving means and said spindle means when said first coupling means is released;
   stop means cooperative with said second coupling means to arrest rotation of said spindle means; and
   means holding said stop means stationarily with respect to said housing means.

2. The invention according to claim 1 wherein:
   said second coupling means includes means movable with respect to said stop means into cooperating relation with the latter in response to release of said first coupling means.

3. The invention according to claim 1 wherein:
   said stop means is spaced from said spindle means; and, said second coupling means includes a member extending beyond said spindle means for cooperating relation with said stop means.

4. The invention according to claim 1 wherein:
   said stop means is disposed in surrounding relation to said spindle and said means holding said stop means is adjustable to innumerable angular positions with respect to said housing means.

5. The invention according to claim 2 together with:
   biasing means between said spindle means and said second coupling means urging the latter for cooperating relation with said stop means.

6. Spindle housing means;
spindle means rotatable with respect to said housing means;
rotary driving means providing driving torque when energized and inertial torque when deenergized;
a releasable coupling connecting the driving torque of said driving means to said spindle and comprising a driving element connected to said driving means and a driven element connected to said spindle;
another coupling connecting the inertial torque of said driving means to said spindle and comprising means connecting said driving element of said releasable coupling and said spindle; and
stop means attached to said housing means and cooperative with said another coupling to arrest the rotation of said spindle means produced by said inertial torque.

References Cited by the Examiner

UNITED STATES PATENTS

| | | |
|---|---|---|
| 776,404 | 11/04 | Keyser. |
| 1,991,686 | 2/35 | Lister _____ 192—149 |
| 2,130,895 | 9/38 | Ness _____ 192—3.2 |
| 2,182,733 | 12/39 | Minkow _____ 192—149 |
| 2,238,538 | 4/41 | Munschauer _____ 192—149 |
| 2,540,854 | 2/51 | Woestemeyer _____ 74—572 |
| 2,649,121 | 8/53 | Reck _____ 140—122 |
| 2,927,741 | 3/60 | Moore et al. _____ 140—122 X |

DAVID J. WILLIAMOWSKY, *Primary Examiner.*

THOMAS J. HICKEY, *Examiner.*